(12) United States Patent
Zätterqvist

(10) Patent No.: US 11,845,552 B2
(45) Date of Patent: Dec. 19, 2023

(54) DISPENSER AND METHOD FOR LAUNCHING COUNTERMEASURES

(71) Applicant: SAAB AB, Linköping (SE)

(72) Inventor: Christer Zätterqvist, Uppsala (SE)

(73) Assignee: SAAB AB, Linköping (SE)

( * ) Notice: Subject to any disclaimer, the term of this patent is extended or adjusted under 35 U.S.C. 154(b) by 102 days.

(21) Appl. No.: 17/612,644

(22) PCT Filed: Jun. 2, 2020

(86) PCT No.: PCT/SE2020/050555
§ 371 (c)(1),
(2) Date: Nov. 19, 2021

(87) PCT Pub. No.: WO2020/246931
PCT Pub. Date: Dec. 10, 2020

(65) Prior Publication Data
US 2022/0234735 A1 Jul. 28, 2022

(30) Foreign Application Priority Data

Jun. 3, 2019 (SE) .................................... 1950654-2

(51) Int. Cl.
*B64D 1/02* (2006.01)
*F41H 11/02* (2006.01)
*F42B 12/70* (2006.01)

(52) U.S. Cl.
CPC ............... *B64D 1/02* (2013.01); *F41H 11/02* (2013.01); *F42B 12/70* (2013.01)

(58) Field of Classification Search
CPC ............. B64D 1/02; F41H 11/02; F42B 12/70
(Continued)

(56) References Cited

U.S. PATENT DOCUMENTS 10,703,451 B1 * 7/2020 Adams .................. F41F 3/10
11,181,346 B1 * 11/2021 Barfoot ................ F41G 7/2246
(Continued)

FOREIGN PATENT DOCUMENTS

EP 0253028 B1 8/1990
EP 1194331 B1 5/2004
(Continued)

OTHER PUBLICATIONS

International Search Report and Written Opinion dated Jun. 26, 2020 for International Application No. PCT/SE2020/050555, 14 pages.

*Primary Examiner* — Samir Abdosh
(74) *Attorney, Agent, or Firm* — SAGE PATENT GROUP

(57) ABSTRACT

A dispenser for storing and launching countermeasures, where the dispenser is adapted for storing the countermeasures in a magazine, where the dispenser is provided with at least one launch opening and where the dispenser is adapted to be mounted on an aircraft, where the dispenser includes a body, a bracket and a magazine housing, where the bracket is rotatable with respect to the body and where magazine housing is rotatable with respect to the bracket, where the magazine housing includes a storage space adapted to hold the magazine, and where the launch opening is arranged in the magazine housing. The invention also includes a method for rotating the magazine and launching a countermeasure. The advantage of the invention is that a countermeasure can be directed in a desired angle before it is launched.

14 Claims, 3 Drawing Sheets

(58) Field of Classification Search
USPC .......................................................... 89/1.51
See application file for complete search history.

(56) References Cited

U.S. PATENT DOCUMENTS

| | | |
|---|---|---|
| 2012/0097795 A1 | 4/2012 | Zätterqvist |
| 2020/0108925 A1* | 4/2020 | Smith .................. G05D 1/0094 |
| 2022/0397360 A1* | 12/2022 | Plemons ................... F42B 4/26 |
| 2023/0031637 A1* | 2/2023 | Milliorn, Jr. ............ F42B 12/70 |

FOREIGN PATENT DOCUMENTS

| | | | |
|---|---|---|---|
| EP | 2157398 A2 | 2/2010 | |
| EP | 2219008 A2 | 8/2010 | |
| GB | 2410542 A | 8/2005 | |
| JP | 2005172363 A | 6/2005 | |
| WO | WO-2021040653 A1 * | 3/2021 | ............... B64D 1/02 |

\* cited by examiner

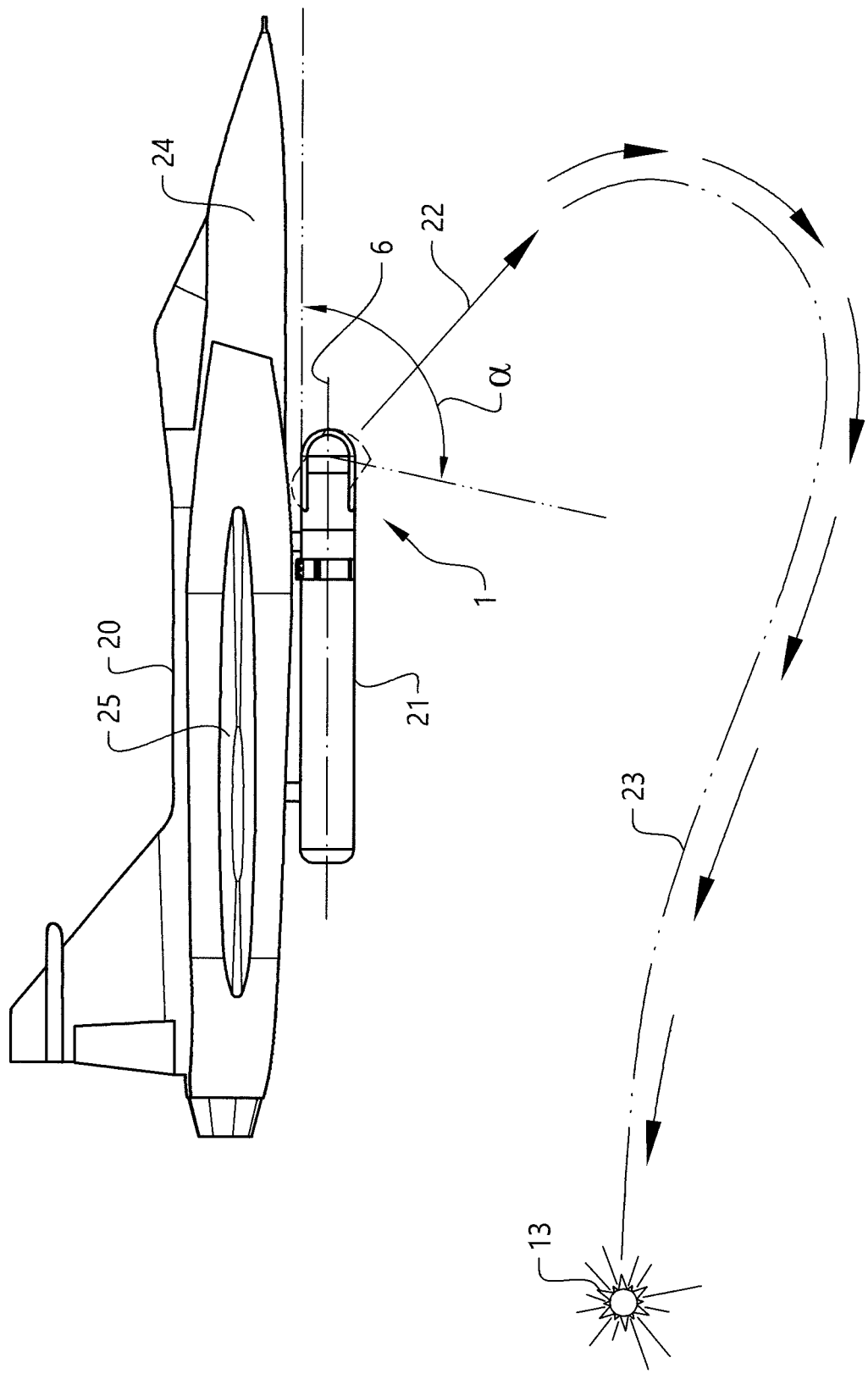

DISPENSER AND METHOD FOR LAUNCHING COUNTERMEASURES

CROSS-REFERENCE TO RELATED APPLICATIONS

This application is a 35 U.S.C § 371 national stage application for International Application No. PCT/SE2020/050555, entitled "DISPENSER AND METHOD FOR LAUNCHING COUNTERMEASURES", filed on Jun. 2, 2020, which claims priority to Swedish Application No. 1950654-2, entitled "DISPENSER AND METHOD FOR LAUNCHING COUNTERMEASURES", filed on Jun. 3, 2019, the disclosures and contents of which are hereby incorporated by reference in their entireties.

TECHNICAL FIELD

The present invention relates to a dispenser for storing and launching countermeasures, such as flares and chaff, where the countermeasures are stored in a dispenser that can direct the countermeasure in different directions.

BACKGROUND ART

Arrangements for storing and launching payloads, such as countermeasures, which are designed to be mounted on aircrafts, are previously known. Such arrangements comprise an elongate body provided with at least one launch opening. The shape of the arrangement may have other equivalent shapes, such as an elliptic or circular shape. However, an elongate body is an efficient shape. Such arrangements are mounted with the longitudinal direction of the elongate body essentially coinciding with the flight direction of the aircraft. The countermeasures are connected to a firing control unit for feeding firing signals to the countermeasures. The countermeasures can consist of passive means, such as chaff foil, but can also consist of for example IR flares, or other active measures. The countermeasures are stored in a magazine in the arrangement, comprising a plurality of cartridges, with one or more countermeasures in each cartridge.

One problem with known arrangements is that unfavourable acoustic phenomenon, such as extremely high air induced noise and vibration levels, are generated due to the open cavities of the cartridges holding the countermeasures, after firing of the countermeasures. The relative wind speed, due to the speed of the aircraft, interacts with the opening of an empty cartridge in which a countermeasure has been stored. The open cavity may act as barrels that oscillate at its natural inherent frequency.

This acoustic noise can be localised by human ear and may also cause damage on the equipment, such as electric components, due to the strong vibrations created. The longitudinal extension and the number of openings of the cartridges in the elongated body can be rather large. The angle of a cartridge relative the travelling direction of the aircraft will also affect the induction of acoustic noise.

It is known to arrange a vortex generating means in front of a launch opening, which is adapted to disturb and distribute the wind flow over the magazine in order to reduce the induced noise by creating a turbulent air flow. However, the effect of such a vortex generating means decreases with the increasing length of the launch opening, since the air flow will be more laminar farther away from the vortex generating means, i.e. the air flow may be relatively laminar at the rear of a longer opening.

Further, such a vortex generating means will generate turbulent flows that are difficult to control and that will result in high-energy losses. Such a solution may also contribute to an increased extension of the design of the arrangement in the longitudinal extension of the elongated body.

A further problem with such an arrangement is that the arrangement is sensitive for influence of the airflow depending e.g. on the speed of the aircraft and of the position of the elongated body. This solution will further not reduce the radar cross section (RCS) created by the open cavities.

An example of a previously known arrangement described as a dispenser which is used for launching countermeasures and which is provided with several cartridges, is described in document EP 1194331 B1. An elongated body of the dispenser is provided with fixed means, described as a spoiler, in front of each compartment for acting on the air stream and for creating a low dynamic pressure across the compartment openings.

From document EP 0253028 B1, it is known to provide the exterior surface of an aircraft with a pair of vortex generators arranged right in front of an inlet opening in order to increase the mass airflow into the inlet.

A further problem with known dispensers is that the launch angle is fixed to a set angle that is believed to be optimal for the intended use. A fixed launch angle may be a good solution for an aeroplane, which has a known flight direction and a known speed range. For a helicopter, a fixed launch angle is however not optimal, since both flight angle, flight speed and the orientation of the aircraft may vary considerably.

JP 2005172363 A discloses a decoy launcher for a ship, where the decoy launcher is mounted in a deck surface of a ship in order to minimize the radar reflective cross section. The decoy launcher is provided with an automatic or semi-automatic loading apparatus, which makes the decoy launcher relatively large and heavy, and unsuitable for mounting on an aircraft.

GB 2410542 A discloses a munition launching assembly to be mounted on a vehicle, e.g. a tank. The munition launching assembly is provided with a loading arrangement, where the munition launching assembly is loaded from the rear of the munition launching assembly, from the interior of the vehicle, which makes the munition launching assembly relatively large and heavy, and unsuitable for mounting on an aircraft.

The known solutions will reduce the acoustic noise induced by an open cavity. They will however cause a high-energy loss. Even though these arrangements may give an acceptable result in some cases, there is room for improvements.

DISCLOSURE OF INVENTION

One object of the present invention is to at least partially eliminate the drawbacks associated with the solutions known in the prior art. Another object is to provide a dispenser having an aerodynamic shape in a resting position. Another object is to minimise the occurrence of acoustic phenomenon in a dispenser, which are caused by the openings in cavities that have been emptied of payloads, such as countermeasures. Another object is to provide a dispenser in which the launch angle can be selected. Another object of the invention is to provide an aircraft comprising such a dispenser.

The solution to the problem according to the invention is described in the characterizing part of claim 1. Claim 14 refers to an advantageous method for launching a countermeasure. Claim 15 refers to an aircraft comprising a dispenser. The other claims contain advantageous embodiments and further developments of the dispenser.

In a dispenser for storing and launching countermeasures, where the dispenser is adapted for storing the countermeasures in a magazine, where the dispenser comprises a body, a bracket and a magazine housing adapted to hold a magazine, and where the dispenser is adapted to be mounted on an aircraft, the object of the invention is achieved in that the magazine housing is provided with a launch opening and a closed end, that the bracket is rotatable with respect to the body, that the magazine housing is rotatable with respect to the bracket from a resting position in which the launch opening is directed towards the body and the closed end is arranged at the front end of the dispenser to an active position in which the launch opening is directed away from the body.

By this first embodiment of the dispenser according to the invention, a dispenser is provided, in which the magazine with the countermeasures can be directed with a selected angle in a desired direction, in which the countermeasure is to be launched. The dispenser may be arranged at the front of an elongated pod adapted to be carried by the aircraft, e.g. under a wing of an aeroplane or carried on the body of the aeroplane. The dispenser may also be integrated in the body of the aircraft. The selected angle depends on the direction of motion of the aircraft, the speed of the aircraft and on the relative azimuth and elevation angle to an incoming threat relative the mounting position of the dispenser. The dispenser is provided with a resting position in which the magazine and the launch opening is directed to the rear end of the dispenser, such that no acoustic noise can be induced by one or more open cavities of the magazine, and such that the shape of the dispenser is aerodynamic. The resting position will direct the launch opening towards the body of the dispenser, such that no opening of the magazine is subjected to an airflow. On an aeroplane, the dispenser may be arranged with the centre axis of the dispenser being parallel with the flight direction of the aeroplane. In this way, the dispenser will be able to direct the launch opening in a half-hemispheric coverage, i.e. in any direction pointing forwards. The resting position for the launch opening will in this case be directed rearwards of the aeroplane. For a helicopter, the dispenser may be arranged at any suitable position, and the launch opening is in the resting position directed towards the body of the dispenser. A suitable mounting position on a helicopter is underneath the helicopter, where the dispenser will be able to cover the complete space below the helicopter, i.e. the half hemisphere below the helicopter. The dispenser may also be integrated in the body of the helicopter. The inventive dispenser can in this case be used as a complement to other magazines arranged on the helicopter, where the magazines are mounted in fixed positions with a fixed direction.

When a countermeasure is to be launched in a selected direction, the magazine is rotated to an active position, pointing in the desired launching direction. The preferred launch direction for an aeroplane is often forwards and downwards with an angle of 30-60 degrees, which leaves the openings of empty cavities of the magazine angled towards the airflow of the aircraft. It is also possible to direct the magazine in a sideway direction. In these directions, there is a risk that acoustic noise is induced in the open cavities of fired countermeasures. When a countermeasure has been launched, the magazine is rotated back to the resting position. In this way, the induced noise and the induced mechanical vibrations are minimized. The radar signature will also be minimized when the launch opening is hidden. The outer surfaces of the body, the bracket and the closed end of the magazine housing will form a closed surface when the dispenser is in the resting position. The shape is the resting position is aerodynamic, and is in one example cylindrical with a semi-circular front end.

The preferred launch direction for a helicopter may be in any direction, since a helicopter may stand still or fly in any direction. There are of course limitations for the possible rotating angle, but it is preferred that the launch opening can be rotated to cover half of a hemisphere. The launch opening can be rotated by 360 degrees around the centre axis and can be directed in any direction forwards from a plane perpendicular to the centre axis.

The bracket is rotated in relation to the body of the dispenser. The bracket is e.g. rotated by a servomotor having a rotational sensor that is used to provide feedback information to the servomotor and to detect the actual angle of the bracket relative to the body of the dispenser. The motor is controlled by an electronic control unit (ECU) connected to the control system of the aircraft. The motor used to rotate the bracket may be arranged in the body of the dispenser or in the bracket. With a motor in the bracket, it is preferred that the signals to the motor and from the rotational sensor are fed through slip rings such that the bracket can be rotated freely without having to turn back at an end stop. In this way, the desired position can be reached as quickly as possible. The motor that rotates the bracket is further preferably provided with a backstop arrangement of some kind, which locks the rotation of the motor when the motor stands still. In one example, the motor is provided with a self-locking worm gear. This will prevent that the bracket changes direction when a countermeasure is launched.

The magazine housing is rotated in relation to the bracket of the dispenser. The magazine housing is e.g. rotated by a servomotor having a rotational sensor that is used to provide feedback information to the servomotor and to detect the actual angle of the magazine housing relative the bracket of the dispenser. The motor is controlled by an electronic control unit (ECU) connected to the control system of the aircraft. The motor used to rotate the magazine housing may be arranged in the bracket or in the magazine housing. With a motor in the magazine housing, it is preferred that the signals to the motor and from the rotational sensor are fed through slip rings such that the magazine housing can be rotated freely without having to turn back at an end stop. In this way, the desired position can be reached as quickly as possible. The signals to and from the magazine housing are preferably also fed through slip rings between the body and the bracket. In one example, the motor is provided with a self-locking worm gear that prevents the dispenser to misalign when a countermeasure is launched.

The magazine is arranged in the magazine housing, where a storage space is provided for the magazine. The magazine is loaded from the front of the dispenser through the launch opening. The dispenser is provided with a fixed breech plate to which the magazine is attached. The magazine is replaceable and is mounted in the storage space with e.g. screws. The magazine housing is preferably suspended in its rotational centre of gravity, such that the magazine housing will be dynamically balanced. This will reduce the required power to rotate the magazine housing and will put less stress on the suspension when a countermeasure is launched. The motor for the magazine housing is further preferably provided with a backstop arrangement of some kind, which locks the rotation of the motor when the motor stands still.

This will prevent that the magazine housing changes direction when a countermeasure is launched.

The dispenser may be mounted at the front of an elongated pod structure that can be carried under a wing of an aeroplane. The dispenser may also be mounted directly on an aeroplane. The dispenser is further suitable to be mounted on a helicopter, where it preferably is directed downwards from the body of the helicopter. The dispenser may also be arranged on other vehicles and vessels, and may even be carried by ground troops for added protection. The dispenser is thus carryable with a light weight, preferably below 10 kg.

The magazine is arranged to be directed by the bracket and the magazine housing in a selected angle with reference to the direction of motion of the aircraft, such that the openings of the cartridges of the magazine can be directed in the selected direction. The magazine and thus the cartridges are adapted to be rotated from a resting position to an active position. Here, the directions will be defined as follows. The forward direction of the aircraft is defined as the direction of motion of the aircraft. An aeroplane is flying in the horizontal plane, i.e. the wings of the plane are parallel to the horizontal plane. The horizontal plane comprises a forward horizontal direction, i.e. the direction of motion of the aircraft, and a sideway horizontal direction, i.e. perpendicular to the forward horizontal direction. The vertical direction is defined as being perpendicular to the horizontal plane. For a helicopter, the normal flight direction is defined in the same way.

The resting position is a position in which the launch opening is directed towards the body of the dispenser, such that the acoustic effect from the openings in the magazine is not present at all. In this position, the launch opening is concealed by the bracket and the rear closed end of the magazine housing is directed forwards. This will also give the dispenser an aerodynamic shape, which minimizes air drag.

The active position is a position in which the launch opening is directed forwards of the dispenser, i.e. away from the body of the dispenser. The active position covers at least half a hemisphere, but may cover a bit more depending on the mounting position of the dispenser. The active position may be limited in some directions depending on the mounting position of the dispenser, such that a countermeasure will not interfere with the aircraft itself.

Hence, the dispenser is adapted to rotate a magazine from a resting position to an active position before a countermeasure is fired and to rotate the magazine back to the resting position after the countermeasure is fired.

The invention also relates to a method for launching a countermeasure from a dispenser mounted on an aircraft. The countermeasure is arranged in a magazine. The method comprises the steps of: tilting the magazine from a resting position in which the countermeasure is directed towards the body of the dispenser, to an active position, launching the countermeasure, and tilting the magazine back to the resting position.

BRIEF DESCRIPTION OF DRAWINGS

The invention will be described in greater detail in the following, with reference to the embodiments that are shown in the attached drawings, in which.

MODES FOR CARRYING OUT THE INVENTION

The embodiments of the invention with further developments described in the following are to be regarded only as examples and are in no way to limit the scope of the protection provided by the patent claims. References such as longitudinal, horizontal, vertical, forward, rearward, sideway, etc. refer to directions of an aircraft flying forwards in a normal orientation.

Figure 2:
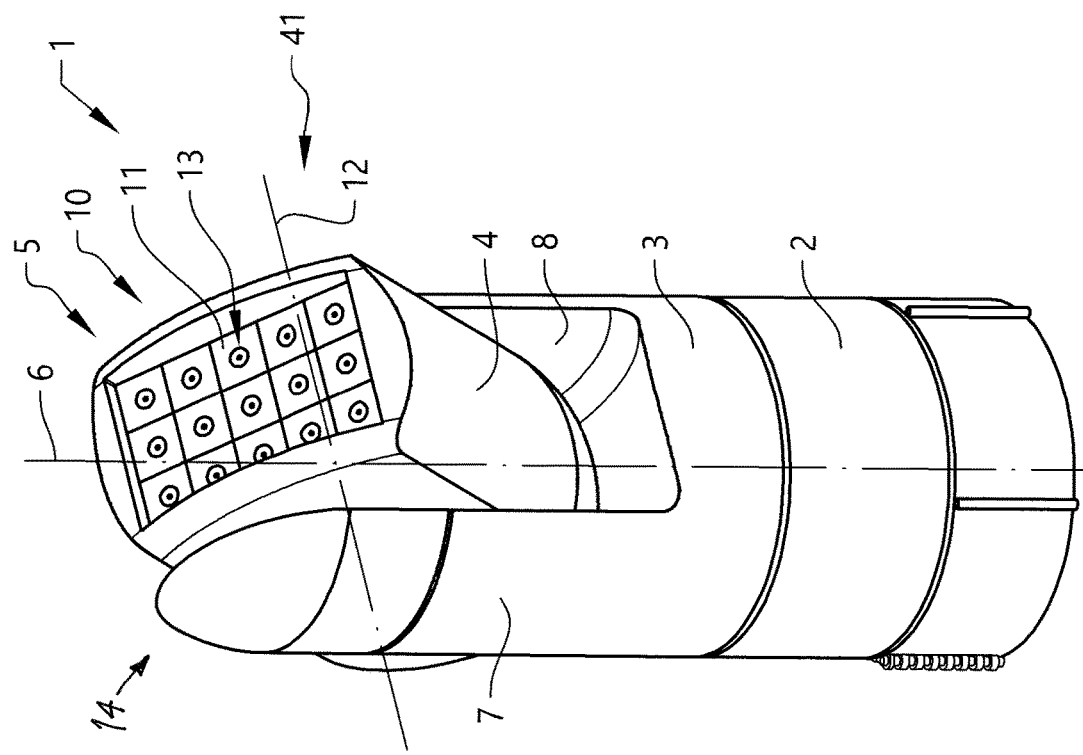
Figure 1:
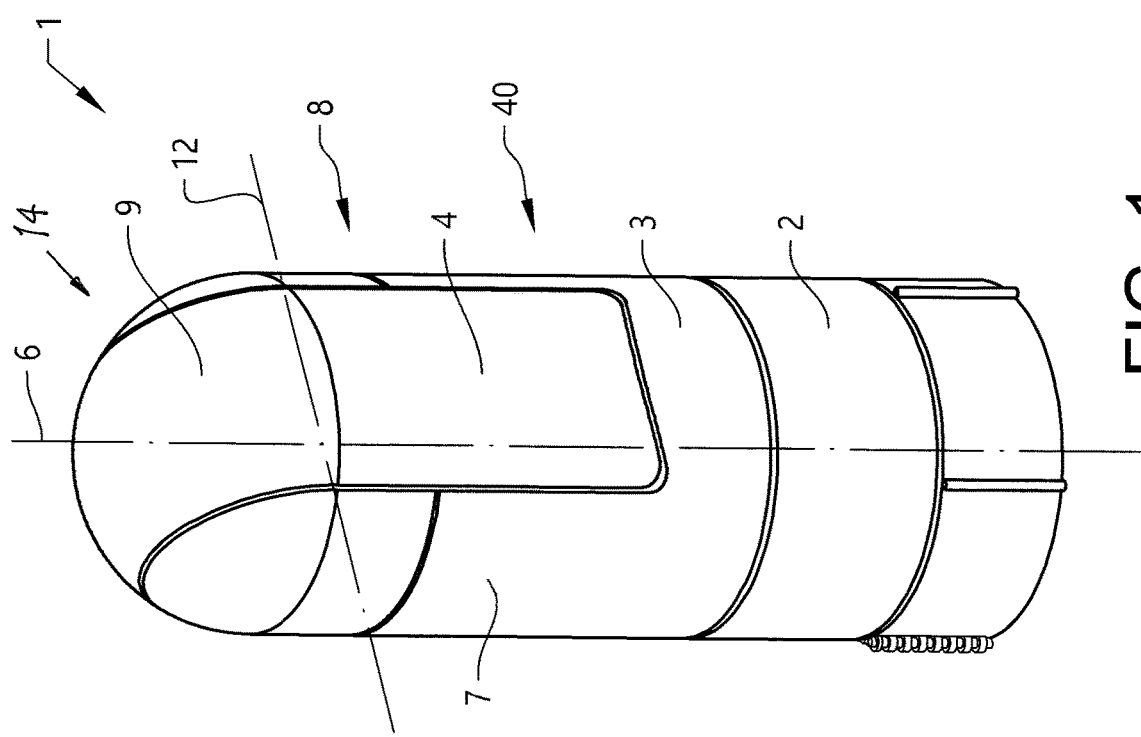
FIG. 1 shows a side view of a dispenser in a resting position according to the invention, FIG. 2 schematically shows a side view of a dispenser in an active position according to the invention, FIG. 3 schematically shows a side view of an aeroplane provided with a dispenser according to the invention for storing and launching countermeasures, and FIG. 4 schematically shows a side view of a helicopter provided with a dispenser according to an embodiment of the invention for storing and launching countermeasures.
Figure 4:
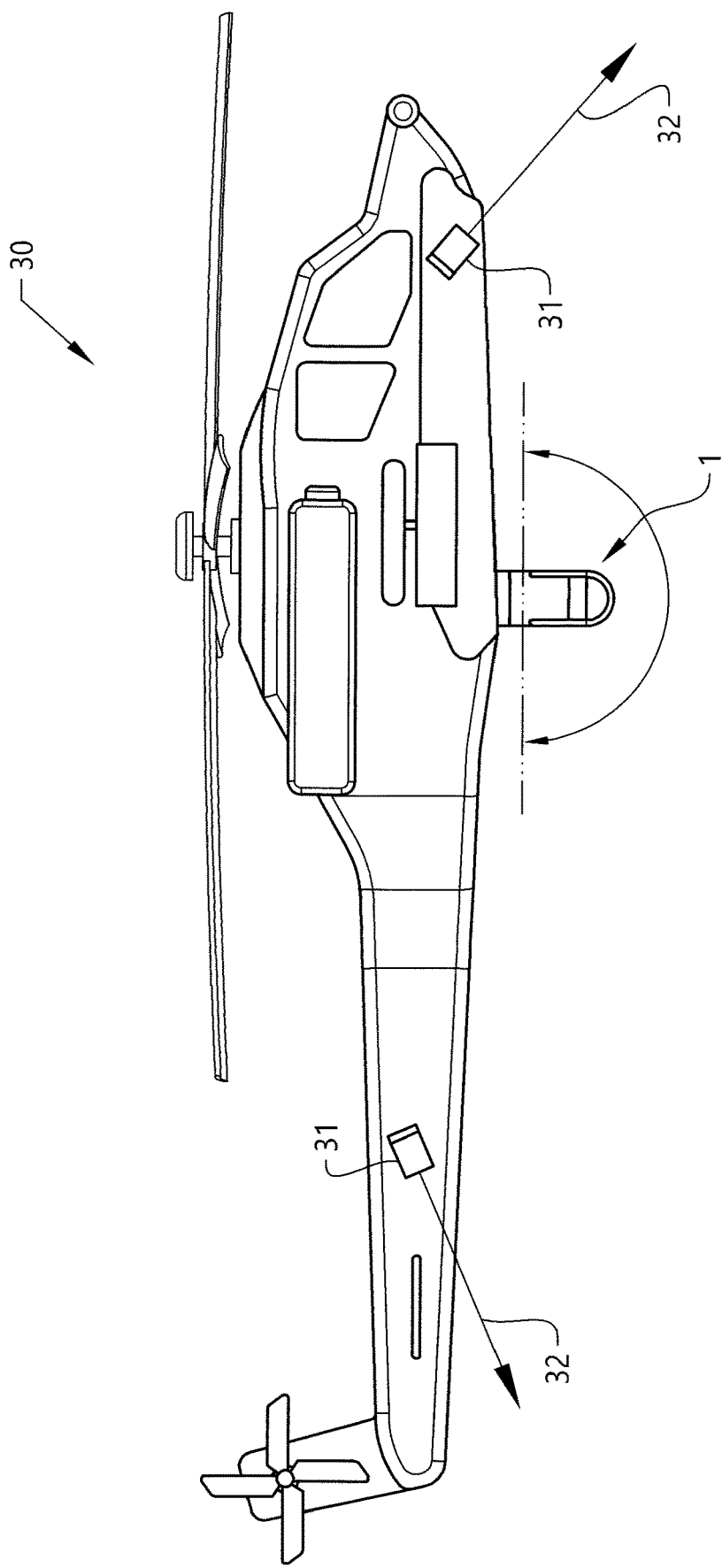

FIGS. 1 and 2 show a dispenser according to the invention, FIG. 3 shows an aeroplane carrying a dispenser and FIG. 4 shows a helicopter provided with a dispenser.

The dispenser 1 comprises three main parts, a body 2, a bracket 3 and a magazine housing 4. The body 2 is the base of the dispenser. The body is used to mount the dispenser to e.g. an aircraft and it will for this reason comprise some kind of mounting means including interface means for mechanical and electrical connection to the dispenser. The body may further comprise an electronic control unit (ECU) that is used to control the dispenser and that will communicate with an external control system, e.g. of an aircraft. The ECU controlling the dispenser may also be positioned externally from the dispenser. The body is in the shown example cylindrical and the centre axis of the body is aligned with a centre axis 6 of the dispenser. Other shapes are possible, but it is important that the shape is aerodynamic in order to reduce air drag. The body may further comprise an electric servomotor adapted to rotate the bracket around the centre axis. A rotational sensor may also be provided in the body. An advantage of arranging the motor for the bracket in the body is that the energy transfer to the motor and the signal from the sensor does not have to rotate, which simplifies the connection.

The bracket 3 is suspended on the body 2 in a rotational manner. The bracket can rotate around the centre axis of the dispenser on the body without limitations, i.e. there is no end stop between the body and the bracket. The bracket may thus be rotated by more than 360 degrees around the centre axis 6 of the dispenser. In this way, it is always possible to select the shortest rotation distance when the bracket is to be rotated to a desired direction. The bracket is preferably suspended to the body through a bearing such that a smooth and reliable rotation is provided. The bracket is in the shown example cylindrical with the same diameter as the body. Other shapes are possible, but it is important that the shape is aerodynamic in order to reduce air drag. The closed end 9 of the magazine housing 4 is for this reason also provided with an aerodynamic shape, e.g. a semi-circular shape. This will give the front end 14 of the dispenser an aerodynamic shape when the magazine housing is in the resting position. The bracket is provided with two arms 7, 8 that extends from the base of the bracket. The arms are adapted to suspend the magazine housing 4 in a rotational manner. At least one arm may for this reason comprise an electrical servomotor adapted to rotate the magazine housing. At least one rotational sensor is also provided in an arm in order to measure the rotation of the magazine housing and to give feedback to the servomotor. The bracket may also comprise the servomotor that is adapted to rotate the bracket in relation to the body. With the motor for the rotation of the bracket arranged in the bracket, the power transfer to the motor is provided through slip rings such that the rotation is not limited. Also the signals from the sensor is led through slip rings in this case.

The servomotors are preferably provided with a backstop arrangement of some kind, which locks the rotation of the motor when the motor stands still. Such a backstop arrangement may be a self-locking worm gear arranged at the servomotor, which will prevent a backlash when the motor stands still. It may also be a cam clutch or a brake that disengages when the motor rotates and engages when the motor stops. The use of a backstop arrangement is important since it will allow the countermeasures to be launched in the desired direction without having to compensate for movement in the magazine housing.

The magazine housing 4 is suspended by the two arms 7, 8, of the bracket 3. The magazine housing and the bracket will form a cylindrical shape having a rounded top. The complete dispenser is thus cylindrical with a semi-circular top. The magazine housing is provided with a storage space 5 adapted to hold a magazine 11. The magazine is loaded from the front of the magazine housing, through the launch opening. The magazine housing is provided with a fixed breech plate to which the magazine is mounted. The storage space ends in a launch opening 10 through which countermeasures are to be launched. The launch opening is provided at one end of the magazine housing. The other end 9 of the magazine housing is closed. A magazine 11 comprises a plurality of cartridges, where each cartridge holds one or more countermeasure of some kind, e.g. a decoy. The magazine may also hold hard kill means. The magazine housing is adapted to rotate in relation to the bracket without limitations such as an end stop. The magazine housing may thus be rotated by more than 360 degrees around the rotational axis 12 of the magazine housing, which is perpendicular to the centre axis 6 of the dispenser. The magazine housing is preferably rotated around its centre of gravity, which is the centre of gravity of the magazine housing with a fully loaded magazine. In this way, the magazine housing will be dynamically balanced. The magazine housing may further comprise one or two motors adapted to rotate the magazine housing in relation to the bracket. The motors are preferably positioned in the arms of the bracket.

The magazine housing is adapted to be in a resting position 40 in which the launch opening 10 is directed rearwards, towards the body 2 of the dispenser, as shown in FIG. 1. In this position, the closed end 9 of the magazine housing will point forwards of the dispenser. This will provide an aerodynamic shape that reduces air drag and interference noise. The magazine housing is adapted to be rotated from the resting position 40 to an active position 41, as shown in FIG. 2, in which the launch opening is directed in a forward direction of the dispenser, pointing away from the body. In an active position, the launch opening may point in any direction away from the body, such that the dispenser covers a semi-hemisphere extending from a plane perpendicular to the centre axis of the dispenser.

An aircraft in the form of an aeroplane 20 is shown in FIG. 3, which is provided with a dispenser 1 for storing and launching countermeasures 13. In this example, the dispenser 1 is mounted at the front of an elongated pod 21 placed under a wing 25 near its attachment to the main body 24 of the aeroplane 20. It is also possible to place the dispenser 1 further out on the wing 25 or directly on the main body 24 of the aeroplane, e.g. on the exterior of the aeroplane. The dispenser 1 is in this example arranged with its centre axis 6 essentially coinciding with the longitudinal direction of the aeroplane 20.

An arrow 22 designates the direction of a launched countermeasure 13 from the dispenser 1. A countermeasure may be a decoy of some kind, such as a flare or chaff, or may be a hardkill means. The character α designates the launch angle relative to the direction of movement of the aeroplane 20 when the countermeasures 13 are launched obliquely forwards and downwards. The trajectory 23 for a launched countermeasure 13, e.g. a flare, is indicated by a broken line. During the time from when a flare 13 is activated for launch to when it reaches the position shown in FIG. 3, sufficient time has elapsed for the flare 13 to have become a fully active decoy target in close proximity to the aeroplane 20. In FIG. 3, the possible launch angles for the dispenser are shown with dash-dotted lines. In the shown example, the launch region of the dispenser is limited in the vertical direction, such that no countermeasure is launched towards the aeroplane. The limited launch region depends on the mounting position on the aeroplane.

The aircraft may also be a helicopter 30 as shown in FIG. 4. Since the helicopter may stand still or may fly upwards, downwards, rearwards, forwards or sideways and with varying speeds, the launch angle will depend on the actual flight direction of the helicopter as well as on the relative azimuth and elevation angle to an incoming threat. The helicopter is in the shown example provided with several magazines 31 mounted in fixed positions with fixed launch directions 32. The helicopter is also provided with a dispenser 1 arranged under the helicopter, which can cover the complete area under the helicopter, i.e. the half-hemisphere below the helicopter. In this way, the fixed magazines and the magazine in the dispenser can complement each other. In FIG. 4, the possible launch angles for the dispenser are shown with dash-dotted lines. In the shown example, the launch region is the complete half-hemisphere below the helicopter. It is possible to limit the launch region in some directions depending on the mounting position of the dispenser. The launch angle limitations is preferably set in the control software, but it would be possible to use mechanical limits.

The countermeasures 13 are connected to a launching control unit (not shown) for feeding launching signals to the countermeasures. The cartridges of a magazine 11 may be individual cartridges mounted to each other in a replaceable manner to form a magazine such that a cartridge can be replaced when it has been launched. A magazine may also comprise fixed cartridges, where a cavity may be reloaded with a new countermeasure. The cartridges can be of the same size or of different sizes and can accommodate identical or different types of countermeasures 13. FIG. 2 schematically shows a magazine comprising five rows with three cartridges in each row.

Here, the directions are defined as follows. The forward direction of the aeroplane is defined as the direction of motion of the aeroplane. The plane is flying in the horizontal plane, i.e. the wings of the plane are parallel to the horizontal plane. The horizontal plane comprises a forward horizontal direction, i.e. the direction of motion of the aircraft, and a sideway horizontal direction, i.e. perpendicular to the forward horizontal direction. The vertical direction is defined as being perpendicular to the horizontal plane. The normal flight direction of a helicopter is defined in the same way.

The invention is not to be regarded as being limited to the embodiments described above, a number of additional variants and modifications being possible within the scope of the subsequent patent claims.

REFERENCE SIGNS

1: Dispenser
2: Body
3: Bracket
4: Magazine housing
5: Storage space
6: Centre axis
7: Arm
8: Arm
9: Closed end
10: Launch opening
11: Magazine
12: Rotational axis
13: Countermeasure
14: Front end
20: Aeroplane
21: Pod
22: Direction of launch
23 Trajectory
24: Main body
25: Wing
30: Helicopter
31: Fixed magazine
32: Direction of launch
40: Resting position
41: Active position

The invention claimed is:

1. A dispenser for storing and launching countermeasures, where the dispenser is adapted for storing the countermeasures in a magazine, where the dispenser comprises a body, a bracket and a magazine housing adapted to hold a magazine, and where the dispenser is adapted to be mounted on an aircraft, wherein the magazine housing is provided with a launch opening and a closed end, that the bracket is rotatable with respect to the body, that the magazine housing is rotatable with respect to the bracket from a resting position in which the launch opening is directed towards the body and the closed end is arranged at a front end of the dispenser to an active position in which the launch opening is directed away from the body, wherein the body or the bracket comprises a bracket motor adapted to rotate the bracket and wherein the bracket motor comprises a self-locking worm gear.

2. The dispenser according to claim 1, wherein the front end of the dispenser is aerodynamically shaped when the dispenser is in the resting position.

3. The dispenser according to claim 1, wherein the dispenser is circular with a semi-circular front end when the dispenser is in the resting position.

4. The dispenser according to claim 1, wherein the magazine is loaded through the launch opening of the magazine housing.

5. The dispenser according to claim 1, wherein the bracket or the magazine housing comprises a magazine housing motor adapted to rotate the magazine housing.

6. The dispenser according to claim 1, wherein the bracket is adapted to be rotated up to and including 360 degrees around a centre axis of the dispenser by the bracket motor.

7. The dispenser according to claim 5, wherein the magazine housing is adapted to be rotated up to and including 360 degrees around a rotational axis that is perpendicular to a central axis of the dispenser by the magazine housing motor.

8. The dispenser according to claim 5, wherein the magazine housing motor comprises a self-locking worm gear.

9. The dispenser according to claim 1, wherein the dispenser comprises a fixed breech plate arranged at the closed end of the magazine housing.

10. The dispenser according to claim 1, wherein a weight of the dispenser is less than 10 kg.

11. The dispenser according to claim 1, wherein the diameter of the body is equal to the diameter of the bracket.

12. The dispenser according to claim 1, wherein the magazine housing is adapted to rotate from the resting position to the active position before a countermeasure is launched and to rotate back to the resting position after the countermeasure has been launched.

13. A method for launching a countermeasure from a dispenser according to claim 1 mounted on an aircraft, where the countermeasure is arranged in a magazine, wherein the method comprises the steps of:
   rotating the magazine from a resting position in which the countermeasure is directed towards the body of the dispenser to an active position;
   launching the countermeasure; and
   rotating the magazine back to the resting position.

14. An aircraft, comprising at least one dispenser according to claim 1.

* * * * *